United States Patent [19]

Funagura et al.

[11] Patent Number: 4,516,733
[45] Date of Patent: May 14, 1985

[54] ELECTRIC FOOD CUTTING MACHINE

[75] Inventors: Shuichi Funagura, Ibaraki; Katsufumi Nishio, Toyonaka, both of Japan

[73] Assignee: Matsushita Electric Industrial Co., Ltd., Osaka, Japan

[21] Appl. No.: 522,365

[22] PCT Filed: Nov. 30, 1982

[86] PCT No.: PCT/JP82/00455
§ 371 Date: Jul. 20, 1983
§ 102(e) Date: Jul. 20, 1983

[87] PCT Pub. No.: WO83/01891
PCT Pub. Date: Jun. 9, 1983

[30] Foreign Application Priority Data

Dec. 3, 1981 [JP] Japan ............................ 56-195193
Dec. 3, 1981 [JP] Japan ............................ 56-195194
Dec. 3, 1981 [JP] Japan ............................ 56-195196
Dec. 3, 1981 [JP] Japan ............................ 56-195197
Dec. 2, 1982 [JP] Japan ............................ 56-194043

[51] Int. Cl.³ .................................................. B02C 18/22
[52] U.S. Cl. .......................................... 241/79; 83/102; 83/355; 241/92

[58] Field of Search ................... 83/102, 355, 356.3; 241/92, 81, 82, 282.1, 282.2, 79, 68, 280, 277, 100, 152 R

[56] References Cited

U.S. PATENT DOCUMENTS 3,211,390 10/1965 Dugle et al. ..................... 241/280
4,095,751 6/1978 Artin .................................. 241/92 X
4,286,885 9/1981 Vibel et al. .................. 241/282.2 X

FOREIGN PATENT DOCUMENTS

56-48340 4/1981 Japan .

Primary Examiner—Mark Rosenbaum
Attorney, Agent, or Firm—Wenderoth, Lind & Ponack

[57] ABSTRACT

An electric food cutting machine which includes a main body, an electric motor and a container mounted on the main body, a disc-shaped cutter in the container rotatively driven by the motor for cutting cut pieces from a food object to be cut, and a disc member positioned in the container below the cutter for rotation by the motor in the same rotational direction as the cutter. The cut pieces are directed to the disc member for being discharged from the container. A passage is defined in the machine for directing the uncut portion of the food object from the cutter so as to separate the cut pieces from the uncut portion.

25 Claims, 20 Drawing Figures

ELECTRIC FOOD CUTTING MACHINE

TECHNICAL FIELD

The present invention relates to an electric food cutting machine or so-called food processor which may be mainly used at home in generally for slicing or cutting vegetables and the like into short and small pieces, pointed chips, etc.

TECHNICAL BACKGROUND

Conventionally, electric food cutting machines of the above described type have been broadly classified into two kinds based on movements of cut pieces subjected to cutting by a disc-shaped cutter driven for rotation by a motor within a container, one kind of which is referred to as a cut piece storage type which accommodates the cut pieces within the container, while the other kind is called a cut piece discharge type which is arranged to discharge the cut pieces out of the container.

In the known electric food cutting machines of the above described type, the electric food cutting machine of the cut piece discharge type adapted to discharge the cut pieces out of the container has been generally constituted by a main body in which an electric motor is incorporated, a container placed on the main body, a disc-shaped cutter driven by the electric motor for rotation within the container, a disc member position below the cutter for rotation in the same direction as that of the cutter so as to discharge the cut pieces processed by the cutter out of the container, a container lid for covering an opening for the container, and a push rod for depressing a food object to be cut towards the cutter through a cylindrical charge port provided in part of said container lid, etc.

Although the conventional electric food cutting machine of the cut piece discharge type constructed in the above described manner is capable of continuously effecting a large amount of cutting without being limited by the size of the container, there has been such a disadvantage that, since it is extremely difficult to reduce a gap between a lower end face of the charge port and an edge face of the cutter to zero, even when the food object to be cut charged through the charge port in the container lid is pushed inwardly to a full extent by the push rod towards the rotating cutter, the last cut pieces remaining in the gap as described above are undesirably discharged out of the container through the same discharge port as for the normal cut pieces to be discharged through an upper portion of the cutter by the disc member, and therefore, the last remaining cut pieces are mixed in the normal cut pieces discharged through the discharge port, thus making it extremely difficult to take out only the cut pieces uniformly processed.

OBJECT OF THE INVENTION

Accordingly, the present invention has for its object to provide an electric cooking machine which is arranged to take out only uniform cut pieces by separating normal cut pieces from last remaining cut pieces, without discharging the last remaining cut pieces via a discharge port through which the normal cut pieces are discharged out of the container, thereby to substantially eliminate disadvantages inherent in the conventional food cutting machines of this kind.

BEST MODE FOR EFFECTING THE PRESENT INVENTION

Subsequently, one preferred embodiment of the present invention will be described hereinbelow based on the accompanying drawings.

In FIGS. 1 to 6, there is shown an electric motor 1 secured to a chassis 2 by set screws 3, while the chassis 2 is fixed to a main body 4 by set screws 5. On a driving shaft 6 of the motor 1, there is fixedly mounted a small pulley 7 arranged to drive, through a belt 8, a large pulley 9 which is mounted on a main spindle 10. The main spindle 10 is supported by the chassis 2 through an oilless bearing 11 which is disposed on the main body 4 through a rubber coupling 12. Mounted at a forward end of the main spindle 10 is a connector 13 to which a cutter mounting base 14 is detachably coupled, with an upper portion of the connector 13 engaged with a groove formed in the cutter mounting base 14 for transmission of a driving force of the motor 1 to a disc-shaped cutter 15 rotatably mounted on said cutter mounting base 14 for cutting the object into short and small pieces, pointed chips, or sliced chips, etc. Below and adjacent to the cutter 15, there is provided a disc member 16 disposed in a relation parallel to the cutter 15 and having a cylindrical portion 17 which extends downwardly from the central portion thereof. The cutter mounting base 14 is engaged with a groove formed in said cylindrical portion 17 for simultaneous rotation of the cutter 15 and disc member 16. A container 18 in which the cutter 15 and the disc member 16 are rotatably accommodated is detachably mounted on the main body 4 through bayonet coupling with respect to said main body 4. As is seen from the drawings, the container 18 has a configuration bulging in one direction, with an upper opening thereof being elliptic as viewed from its top. A container lid 19 is detachably mounted on the container 18 so as to close the upper opening of said container 18. The container lid 19 is formed with a charge port 20 for charging an object or material to be cut thereinto so as to push the material thus charged in said charge port 20 by a push rod 21 towards the cutter 15, while, at part of the container 18 and the container lid 19, there is provided a discharge port 22 which may serve as a passage for discharging the cut pieces processed by the cutter 15 out of the container 18. The lower face of the main body 4 is covered with a back plate 23 having a plurality of legs 24 secured thereto. At the discharge port 22, a partition wall 25 depends from a ceiling of the container lid 19 down to a position immediately below an outer peripheral edge of the cutter 15 for preventing last remaining cut pieces of the object from being discharged via the discharge port 22 through the upper surface of the cutter 15. The partition wall 25 extends over a width approximately equal to that of the discharge port 22. There is provided a passage A for the last remaining cut pieces, which is defined by the space for the container 18 and the bulging portion of the container lid 19. An upper main body 25 is secured to the main body 4 by a set screw 27 for covering the upper portion of the main body 4, with a decorative sheet 28 being further applied onto the upper main body 26 to keep the set screw 27 out of sight. On the main body 4 in a position below the upper main body 26, there is provided a switch 29 which is arranged to be actuated by a projection 30 provided at part of the container lid 19 upon application of the container lid 19 onto the container 18 so as to supply electric power to the motor 1 for rotation of said motor 1. The small pulley 7 is fixed to the lower end of the driving shaft 6 of the motor 1 by a nut 31, while the large pulley 9 is also secured to the lower end of the main spindle 10 by a nut 32. The lower end 33 of the charge port 20 is located above and adjacent to the edge face 34 of the cutter 15.

Subsequently, operations and functions of the electric food cutting machine as described above will be explained hereinbelow.

Figure 1:
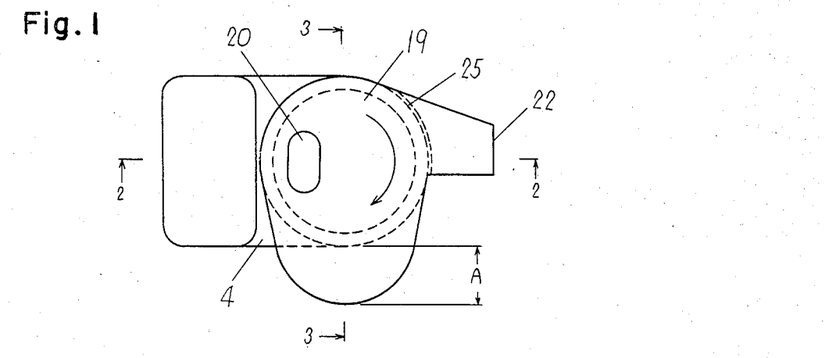
FIG. 1 is a top plan view of an electric food cutting machine according to one preferred embodiment of the present invention.
Figure 2:
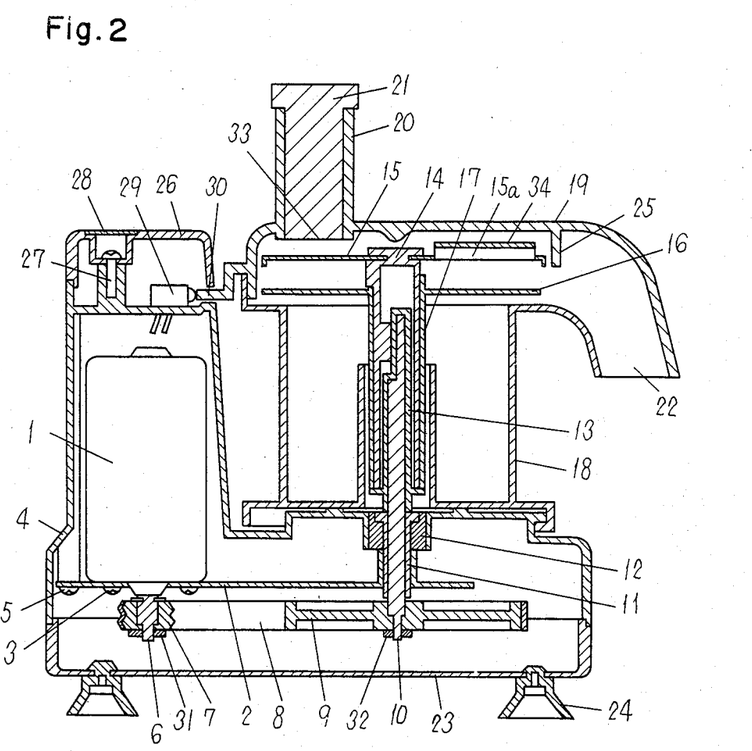
FIG. 2 is a cross section on an enlarged scale, taken along the line 2—2 in FIG. 1.
Figure 3:
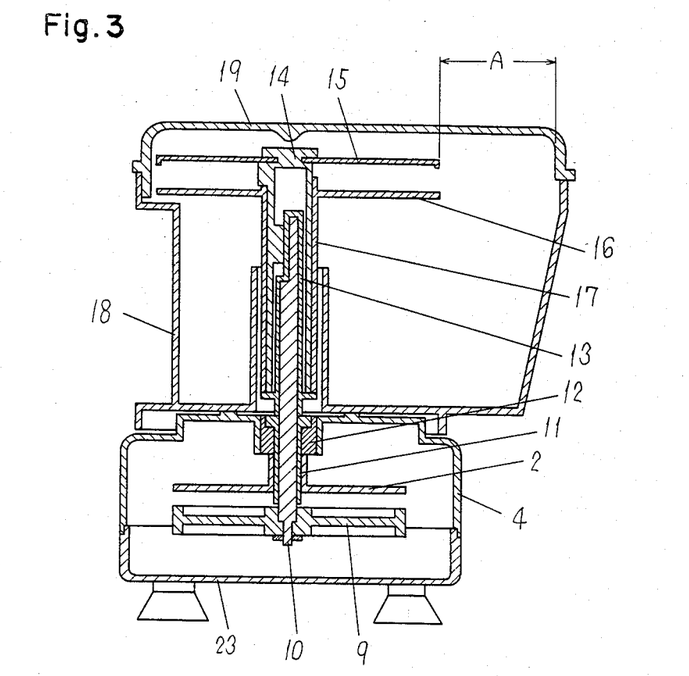
FIG. 3 is a cross section on an enlarged scale, taken along the line 3—3 in FIG. 1.
Figure 4:
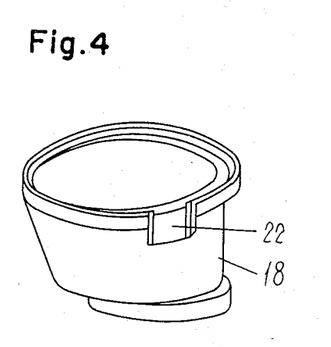
FIG. 4 is a perspective view of a container employed in the electric food cutting machine of FIG. 1.
Figure 5:
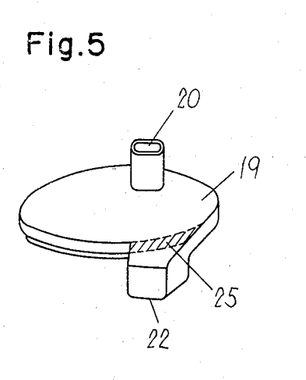
FIG. 5 is a perspective view of a container lid employed in the electric food cutting machine of FIG. 1.
Figure 6:
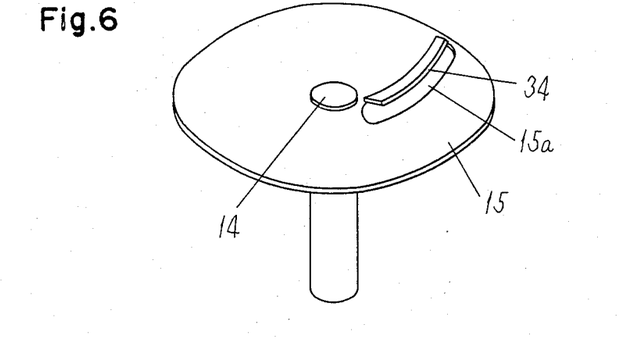
FIG. 6 is a perspective view of a cutter employed in the electric food cutting machine of FIG. 1.
Figure 7:
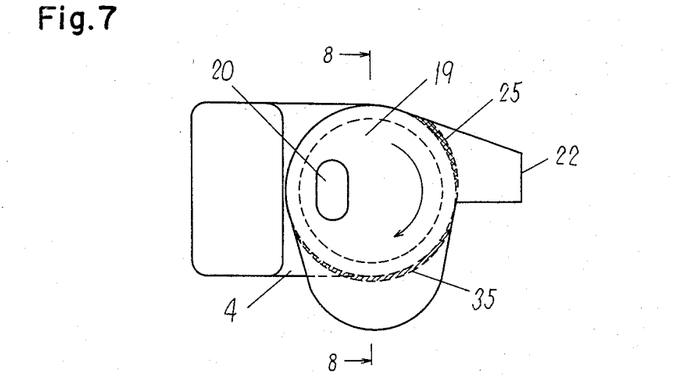
FIG. 7 is a top plan view of an electric food cutting machine according to another embodiment of the present invention.
Figure 8:
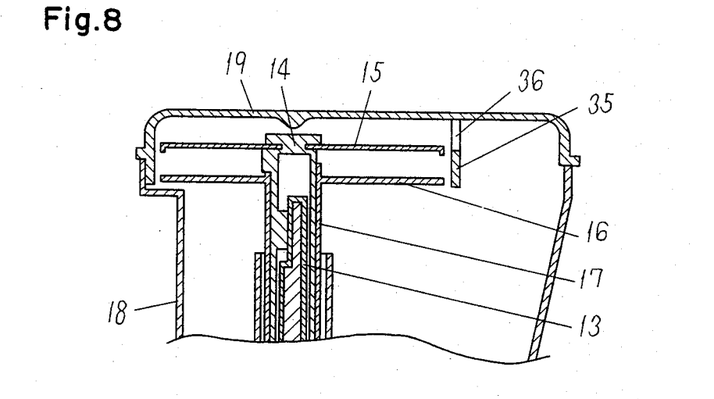
FIG. 8 is a fragmentary cross section on an enlarged scale, taken along the line 8—8 in FIG. 7.
Figure 9:
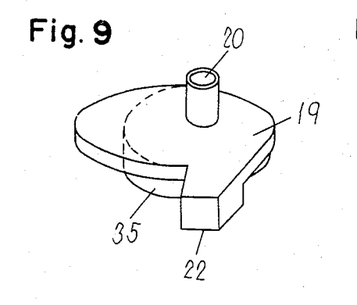
FIG. 9 is a perspective view of a container lid employed in the electric food cutting machine of FIG. 7.
Figure 10:
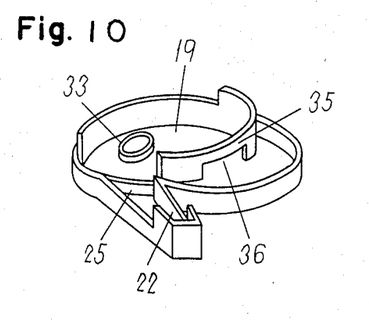
FIG. 10 is a perspective view of the container lid of FIG. 9 when turned over.

The container 18 is combined with the main body 4 through the bayonet coupling, and the cylindrical portion 17 of the disc 16 is fitted over the connector 13. In the next step, the cutter mounting base 14 with the cutter 15 attached thereto is fitted onto the disc 16 and connector 13. Thereafter, the container lid 19 is coupled with the container 18 through the bayonet coupling, whereby the projection 30 of the container lid 19 actuates the switch 29 to feed electric power to the motor 1, and thus, the driving force of the motor 1 transmitted to the main spindle 10 through the belt 8 is further transmitted to the cutter mounting base 14 engaged with the main spindle 10, with consequent rotation of the cutter 15 and the disc member 16 in a direction indicated by an arrow in FIG. 1. In the above state, when the food object to be cut introduced into the charge port 20 is further pushed thereinto by the push rod 21, the food object is cut into pieces by the rotating cutter 15. The cut pieces thus processed by the cutter 15 fall onto the disc member 16 located below said cutter 15 through an opening 15a provided under the edge face 34, and are continuously discharged out of the container 18 via the discharge port 22 defined by the container 18 and the container lid 19 through a centrifugal force produced by the rotation of the disc member 16.

The last remaining cut pieces in a flat plate-like shape not subjected to the cutting by the cutter 15, and staying between the lower edge 33 of the charge port 20 and the edge face 34 of the cutter 15 are urged to be discharged directly from the discharge port 22 through the upper surface of the cutter 15 by the centrifugal force arising from rotation of the cutter 15, but are obstructed by the partition wall 25 provided in the container lid 19 so as to be accommodated into the container 18 via the passage A defined by the space of the container 18 and the bulging portion of the container lid 19, through the portion without the partition wall 25 between the discharge port 22 and the charge port 20 downstream of said discharge port 22 with respect to the direction of rotation of said cutter 15. The passage A may be formed in either one of the container 18 or the container lid 19 or between the both, and is not particularly limited as to how it is provided.

As described above, the embodiment according to the present invention has an entirely novel construction which is so arranged that only the normal cut pieces processed by the cutter 15 are discharged through the cut piece discharger port 22, while the last remaining cut pieces are accommodated within the container 18. Accordingly, there is no possibility that the last remaining cut pieces are mixed in with the normal cut pieces. It is to be noted here that the passage A for leading the last remaining cut pieces into the container 18 is provided at the portion between the discharge port 22 of the container lid 19 and the charge port 20 downstream of said discharge port 22 with respect to the rotational direction of the cutter 15 as described above. Since, such portion is located downstream of the discharging of the cut pieces on the disc member 16, there is no possibility that the cut pieces on the disc member 16 will be directed into the container 18 thereat. Furthermore, the installation of the passage A at said portion is advantageous in that the last remaining cut pieces may be led into the container 18 without necessity for providing particular partition walls and the like in the container 18 and the container lid 19, thereby facilitating cleaning of said container 18 and container lid 19.

Reference is made to FIGS. 7 to 10 showing another embodiment according to the present invention, in which like parts in the previous embodiment are designated by like reference numerals. As compared with the previous embodiment, the main differences are such that there is provided a partition wall 35 depending from the inner top surface of the container lid 19 to a position close to the outer peripheral edge of the disc member 16, and having its lower edge extending downwardly to a position lower than the upper surface of the disc member 16, while an opening 36 is formed in said partition wall 35 at a position in the vicinity of the upper surface of the cutter 15 so as to utilize said opening 36 as a passage for guiding the last remaining cut pieces of the object not subjected to cutting by the cutter 15 into the container 18. In the above arrangement, there are such advantages that the position for accommodating the last remaining cut pieces in the container 18 may be set at any place except the discharge port 22, and also that, even if the cut pieces on the disc member 16 are not once discharged from the discharge port 22, they are prevented from falling into the container 18 by the partition wall 35 so as to be discharged through the discharge port 22 during subsequent rotation of the disc member 16.

Figure 11:
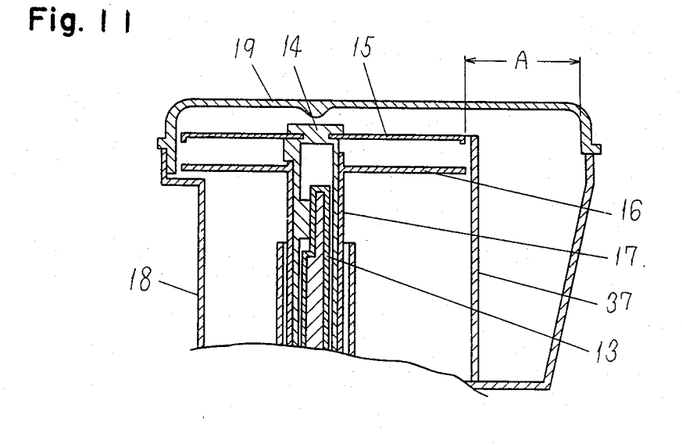
FIG. 11 is a fragmentary side sectional view of an electric food cutting machine according to a further embodiment of the present invention.
Figure 12:
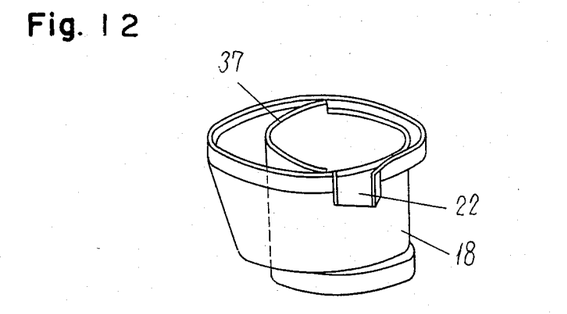
FIG. 12 is a perspective view of a container employed in the electric food cutting machine of FIG. 11.
Figure 13:
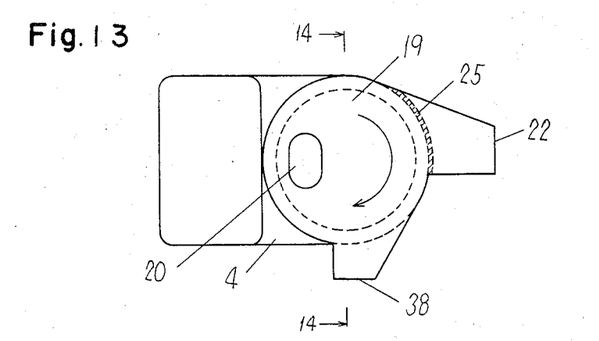
FIG. 13 is a top plan view of an electric food cutting machine according to still another embodiment of the present invention.
Figure 14:
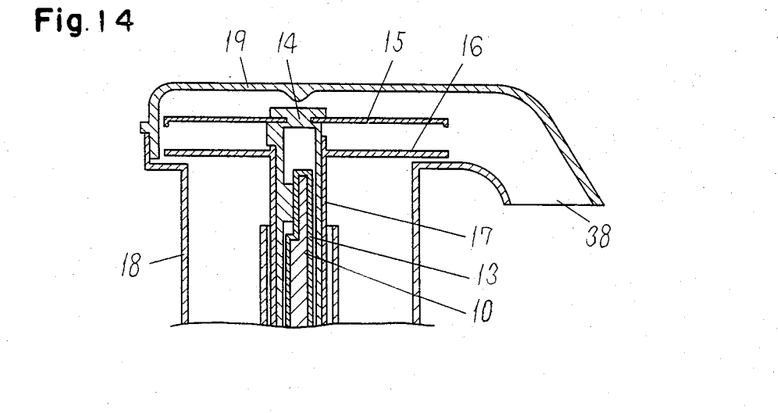
FIG. 14 is a cross section on an enlarged scale, taken along the line 14—14 of FIG. 13.
Figures 15, 16:
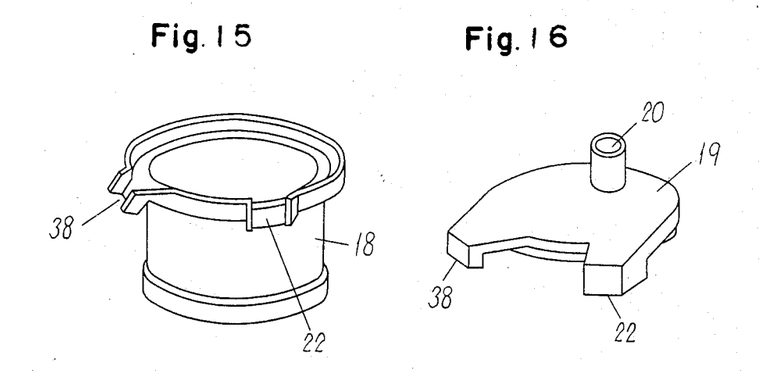
FIG. 15 is a perspective view of a container employed in the electric food cutting machine of FIG. 14.
FIG. 16 is a perspective view of a container lid employed in the electric food cutting machine of FIG. 14.

In a further embodiment according to the present invention as shown in FIGS. 11 and 12, it is so arranged that, on a bottom portion within the container 18 and along the outer peripheral edge of the disc member 16, there is provided a partition wall 37 whose upper edge is located between the upper surfaces of the disc member 16 and the cutter 15, so that the space defined between the upper edge of said partition wall 37 and the container lid 19 is utilized as the passage A for guiding the last remaining cut pieces of the object not subjected to the cutting by the cutter 15, into the container 18 sectioned by the partition wall 37. In the above arrangement, since the partition wall 37 is provided to extend upwardly from the bottom face of the container 18 so that the upper edge of said partition wall 37 is positioned between the upper surfaces of the disc member 16 and the cutter 15, the position for accommodating the last remaining cut pieces in the container 18 may be set at any place except the discharge port 22, and even if the cut pieces on the disc member 16 are not once discharged from the discharge port 22, they are prevented from falling into the container 18 by the partition wall 37 so as to be discharged out of the discharge port 22 during subsequent rotation of the disc member 16. Moreover, even if the cut pieces accumulated on the disc member 16 should fall into the container 18 through the gap between the disc member 16 and the side wall of the container 18, or through the gap between the disc member 16 and the partition wall 37, only the normal cut pieces may be readily taken out, since the place at which the normal cut pieces are accommodated is separated by the partition wall 37, from the place where the last remaining cut pieces are stored within the container 18.

Figure 17:
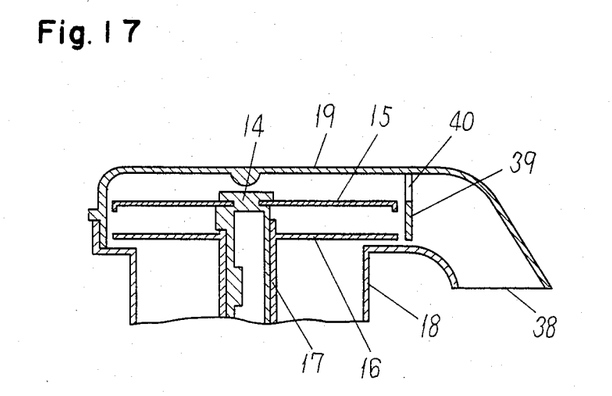
FIG. 17 is a fragmentary side sectional view showing an electric food cutting machine according to another embodiment different from the embodiment in FIGS. 13 to 16.
Figure 18:
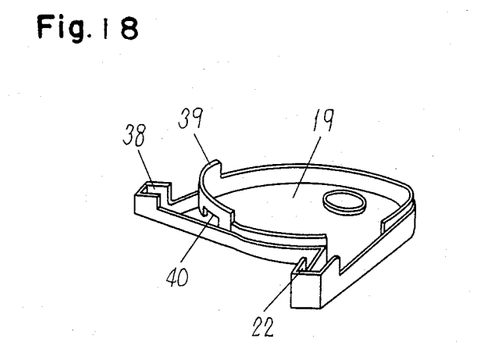
FIG. 18 is a perspective view of a container lid employed in the electric food cutting machine of FIG. 17.

In FIGS. 13 to 18 showing still another embodiment according to the present invention, as compared with the foregoing embodiments of FIGS. 1 through 12 which are adapted to accommodate last remaining cut pieces in the container 18, it is so modified that there are provided two separate discharge ports, i.e., one discharge port 22 for discharging the normal cut pieces processed by the cutter 15 out of the container 18 and another discharge port 38 for discharging the last remaining cut pieces not processed by the cutter 15 out of the container 18. In the above arrangement, although the normal cut pieces are discharged through the discharge port 22, the last remaining cut pieces staying on the upper surface of the cutter 15 are obstructed by a partition wall 25 provided in the container lid 19, and are discharged out of the container 18 through the other discharge port 38 for discharging the last remaining cut pieces, at the portion between the discharge port 22 and the charge port 20 downstream of said discharge port 22 with respect to the rotational direction of the cutter 15 beyond the partition wall 25. It should be noted here that, as shown in FIGS. 17 and 18, if a partition wall 39 depending from the container lid 19 to a position lower than the outer peripheral edge of the disc 16 is provided with an opening 40 formed in said partition wall 39 in the vicinity of the upper surface of the cutter 15 so as to allow discharge of the last remaining cut pieces through said opening 40, the discharge port 38 may be provided at any position except for the discharge port 22. By the arrangement as described above for discharging the normal cut pieces and the last remaining cut pieces through the separate discharge ports 22 and 38, a large amount of material may be continuously cut even when the container 18 and the container lid 19 are reduced in size, if large trays are provided respectively for receiving the last remaining cut pieces and normal cut pieces at the outside of the container 18. It should also be noted that, in the above embodiment, the top plan configuration of the container 18 need not necessarily be of a circular shape.

Figure 19:
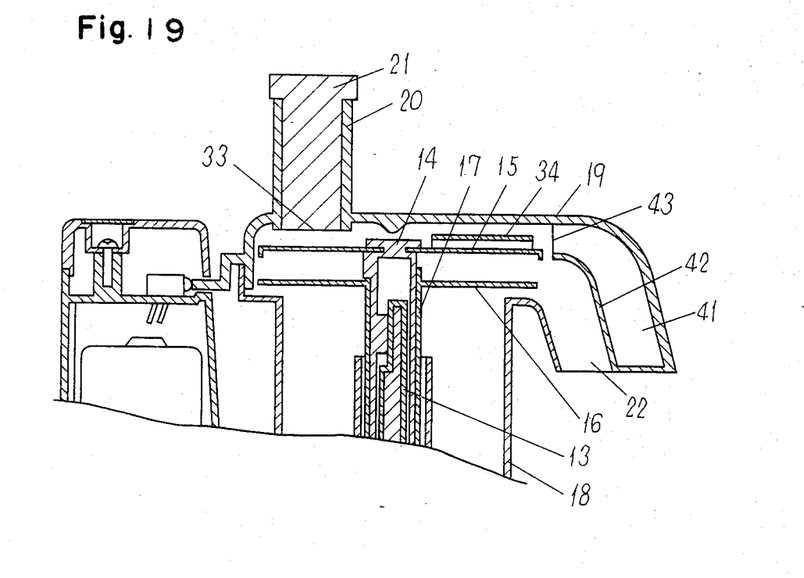
FIG. 19 is a fragmentary side sectional view of an electric food cutting machine according to a still further embodiment of the present invention.
Figure 20:
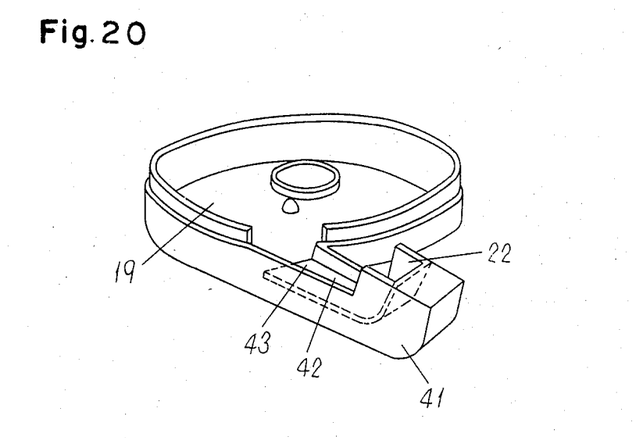
FIG. 20 is a perspective view of a container lid employed in the electric food cutting machine of FIG. 19.

Reference is further made to FIGS. 19 and 20 showing still a further embodiment according to the present invention, in which a space 41 having a bag-like configuration for accommodating therein the last remaining cut pieces on the cutter 15 is provided in the container lid 19 at a position lower than the upper surface of the cutter 15. In this arrangement, the last remaining cut pieces on the cutter 15 are directed into the space 41, through the opening 43 of the partition wall 42 provided in said container lid 19 and located in a position slightly lower than the surface of the cutter 15. By the arrangement in which the last remaining cut pieces are accommodated in the container lid 19 as described above, not only can the size of the container 18 be reduced, but it becomes possible to treat the last remaining cut pieces only by the container lid 19 alone, without necessity for detaching the two members, i.e., the container 18 and the container lid 19, from the main body 4 for the disposal of the last remaining cut pieces.

As is clear from the foregoing embodiments, in the electric food cutting machine according to the present invention, it is possible to obtain only uniformly cut, normal cut pieces by separating the normal cut pieces of the food object processed by the cutter from the last remaining cut pieces, without requiring such a procedure as sorting large last remaining cut pieces out of the normal cut pieces for removal, and thus, the food cutting work may be effected in an extremely efficient manner.

What is claimed is:

1. An electric food cutting machine, comprising:
   a main body;
   an electric motor mounted on said main body;
   a container mounted on said main body;
   a disc-shaped cutter in said container, rotatively driven by said motor for cutting cut pieces from a food object to be cut;
   a disc member positioned in said container below said cutter for rotation by said motor in the same rotational direction as said cutter;
   means, defining a cut pieces path terminating at said disc member, for directing the cut pieces cut from the food object to be cut to said disc member;
   means, including said disc member, for discharging the cut pieces from said container; and
   passage means, defining a passage in said container spaced from said cut pieces path extending away from said cutter, for directing any uncut portion of the food object to be cut not cut therefrom into the cut pieces, along the passage away from said cutter so as to separate the cut pieces from the uncut portion.

2. A machine as in claim 1, wherein said cutter is so disposed in said container so as to have a cutting space thereabove, said cutter having a cutter opening therein defining said cut pieces directing means, for directing the cut pieces therethrough onto said disc member, said passage extending across the outer periphery of said cutter and communicating with said cutting space.

3. A machine as in claim 1, wherein said passage terminates within said container so as to guide the uncut portion into the container.

4. A machine as in claim 3, wherein said machine further comprises a charging port for guiding the food object to be cut to said cutter, located at a first off-axis location with respect to the rotational axis of said cutter, said cut pieces discharging means including a cut pieces discharge port at a second off-axis location downstream of said charging port with respect to the rotational direction of said cutter, said passage extending from a third off-axis location between said first off-axis location and said second off-axis location downstream of said second off-axis location.

5. A machine as in claim 3, wherein said container has a container opening above said cutter, said machine further comprising a lid covering said container opening, said lid having an upper wall above said cutter and a partition wall extending downward from said upper wall beyond the peripheral edge of said cutter to a location close to the outer peripheral edge of said disc member so as to block radial movement of the cut pieces and the uncut portion therepast, said partition wall having a partition opening therein adjacent the upper surface of said cutter, said passage extending through said partition opening for guiding the uncut portion into said container.

6. A machine as in claim 1, wherein said passage terminates outside of said container so as to guide the uncut portion outside of said container.

7. A machine as in claim 1, wherein said container further comprises a container opening above said cutter, said machine further comprising a lid covering said container opening, said lid having a lid portion containing said passage at a passage location below the upper surface of said cutter.

8. An electric food cutting machine, comprising:
a main body;
an electric motor mounted on said main body;
a container, having a container opening mounted on said main body;
a lid covering said container opening;
a disc-shaped cutter in said container rotatively driven by said motor for cutting cut pieces from a food object to be cut;
a disc member positioned in said container below said cutter for rotation by said motor in the same rotational direction as said cutter;
means, defining a cut pieces path terminating at said disc member, for directing the cut pieces cut from the food object to be cut to said disc member;
means, including said disc member, for discharging the cut pieces from said container; and passage means, defining a passage in said lid spaced from said cut pieces path, for directing any uncut portion of the food object to be cut not cut therefrom into the cut pieces, along said passage away from said cutter so as to separate the cut pieces from the uncut portion.

9. A machine as in claim 8, wherein said cutter is so disposed in said container so as to have a cutting space thereabove, said cutter having a cutter opening therein defining said cut pieces directing means, for directing the cut pieces therethrough onto said disc member, said passage extending across the outer periphery of said cutter and communicating with said cutting space.

10. A machine as in claim 8, wherein said passage terminates outside of said container so as to guide the uncut portion outside of said container.

11. A machine as in claim 8, wherein said passage extends below the upper surface of said cutter.

12. A machine as in claim 8, wherein said passage terminates within said container so as to guide the uncut portion into said container.

13. A machine as in claim 12, wherein said machine further comprises a charging port for guiding the food object to be cut to said cutter, located at a first off-axis location with respect to the rotational axis of said cutter, said cut pieces discharging means including a cut pieces discharge port at a second off-axis location downstream of said charging port with respect to the rotational direction of said cutter, said passage extending from a third off-axis location between said first off-axis location and said second off-axis location downstream of said second off-axis location.

14. A machine as in claim 12, wherein said lid has an upper wall above said cutter and a partition wall extending downward from said upper wall beyond the peripheral edge of said cutter to a location close to the outer peripheral edge of said disc member so as to block radial movement of the cut pieces and the uncut portion therepast, said partition wall having a partition opening therein adjacent the upper surface of said cutter, said passage extending through said partition opening for guiding the uncut portion into said container.

15. A machine as in claim 12, further comprising a partition wall in said container extending upward from said disc member along the outer peripheral edge of said disc to an upper edge between the upper surface of said disc member and the upper surface of said cutter so as to define a space between the upper edge of said partition and said lid at said passage.

16. An electric food cutting machine, comprising:
a main body;
an electric motor mounted on said main body;
a container having a top container opening, mounted on said main body;
a lid covering said container opening;
a disc-shaped cutter in said container rotatively driven by said motor for cutting cut pieces from a food object to be cut;
a disc member positioned in said container below said cutter for rotation by said motor in the same rotational direction as said cutter;
means, defining a cut pieces path terminating at said disc member, for directing the cut pieces cut from the food object to be cut to said disc member;
means, including said disc member, for discharging the cut pieces from said container; and
passage means, defining a passage between said container and said lid spaced from said cut pieces path, for directing any uncut portion of the food object to be cut not cut therefrom into the cut pieces, along the path away from said cutter so as to separate the cut pieces from the uncut portion.

17. A machine as in claim 16, wherein said cutter is so disposed in said container so as to have a cutting space thereabove, said cutter having a cutter opening therein for directing the cut pieces therethrough onto said disc member, said passage extending across the outer periphery of said cutter and communicating with said cutting space.

18. A machine as in claim 16, wherein said passage terminates outside of said container so as to guide the uncut portion outside of said container.

19. A machine as in claim 16, wherein said passage terminates outside of said container so as to guide the uncut portion outside of said container.

20. A machine as in claim 16, wherein said passage terminates within said container so as to guide the uncut portion into the container.

21. A machine as in claim 20, wherein said machine further comprises a charging port for guiding the food object to be cut to said cutter, located at a first off-axis location with respect to the rotational axis of said cutter, said cut pieces discharging means including a cut pieces discharge port at a second off-axis location downstream of said charging port with respect to the rotational direction of said cutter, said passage extending from a third off-axis location between said first off-axis location and said second off-axis location downstream of said second off-axis location.

22. A machine as in claim 14, wherein said lid has an upper wall above said cutter and a partition wall extending downward from said upper wall beyond the peripheral edge of said cutter to a location close to the outer peripheral edge of said disc member so as to block radial movement of the cut pieces and the uncut portion therepast, said partition wall having a partition opening therein adjacent the upper surface of said cutter, said passage extending through said partition opening for guiding the uncut portion into said container.

23. A machine as in claim 16, further comprising a partition wall extending downward from said lid to below said disc member, having a discharge opening therein defining said passage adjacent the upper surface of said cutter.

24. A machine as in claim 16, wherein said cutter includes means for moving the any uncut portion of the food object to be cut not cut therefrom into the cut pieces, with rotation of said cutter to said passage means to be directed thereby away from said cutter.

25. A machine as in claim 16, wherein said cutter is formed in a first horizontal plane, said disc member being formed directly below said cutter in a second horizontal plane, said cut pieces path comprising an opening in said cutter directly above said disc member, said cutter being disposed in said container so as to have a cutting space thereabove, said machine further comprising a charging port for guiding the food object to be cut to said cutting space to be cut by said cutter.

* * * * *